United States Patent [19]

Beaver et al.

[11] 4,397,423

[45] Aug. 9, 1983

[54] MATERIAL DISTRIBUTION DEVICE

[76] Inventors: Jeffrey L. Beaver, 1005 S. Third St., Lafayette, Ind. 47905; Robert J. Kennedy, Jr., 176 Ivy Hill Dr.; Kendall Smith, II, 488 Littleton, both of West Lafayette, Ind. 47906; Gregory N. Brown, 1226 Greenbush Ave., Lafayette, Ind. 47904

[21] Appl. No.: 124,142

[22] Filed: Feb. 25, 1980

[51] Int. Cl.³ ............................................. B65G 65/32
[52] U.S. Cl. ........................................ 239/684; 193/32; 239/553.5; 414/301
[58] Field of Search .................... 414/288, 293, 301; 193/3, 32, 34; 239/590.5, 553.5, 650, 684, 688

[56] References Cited

U.S. PATENT DOCUMENTS

| | | | |
|---|---|---|---|
| 232,597 | 9/1880 | Coleman | 193/3 |
| 2,611,685 | 9/1952 | Yoder | 414/293 X |
| 3,429,419 | 2/1969 | Donelson | 414/301 X |
| 3,563,476 | 2/1971 | Donelson | 414/301 X |
| 3,780,887 | 12/1973 | Bottoms | 414/301 X |

Primary Examiner—Robert G. Sheridan
Attorney, Agent, or Firm—John R. Nesbitt

[57] ABSTRACT

A material distribution device is disclosed for spreading material such as grain during bin loading. A hopper, having a plurality of funnels therein acts in conjunction with the grain to automatically establish the path of the grain through the hopper according to flow rate of the grain passing through the hopper. Arms, rotated by a variable speed drive, receive the grain from the hopper and direct the grain into the bin with the speed of rotation, length and angle with respect to horizontal of the arms being selected and/or controlled to achieve uniform distribution of the grain throughout the bin without causing appreciable grain damage due to impact.

3 Claims, 18 Drawing Figures

MATERIAL DISTRIBUTION DEVICE

FIELD OF THE INVENTION

This invention relates to a material distribution device and, more particularly, relates to a spreading device for distributing grain within a bin during loading of the bin.

BACKGROUND OF THE INVENTION

It is oftentimes neccessary that material be spread over an area in order to achieve a desired end. Such is the case, for example, where grain is to be distributed within a grain drying and/or storage bin.

Grain bin spreaders are known and have been heretofore used for distribution of grain within a bin. For grain drying bins, air is commonly blown from below the grain up through the grain for drying, and it is therefore important that the grain be distributed evenly from the center to the outer edges of the bin in order to provide a more uniform resistance to air flow. In addition, it is important that various particle sizes be distributed uniformly throughout the bin in order to avoid "hot spots" which are areas where high concentrations of small particles, or "fines" that are especially subject to rot.

With respect to devices now known and/or utilized, most utilize small diameter platforms and/or paddles which spin at a high rate in order to propel the grain to the outer edges of the bin.

Prior grain spreading devices have, however, not been fully satisfactory, at least for all purposes, since such devices have not achieved the desired uniformity in distribution of materials and/or having not avoided impact damage to the grain due to the manner in which the material is loaded into the bin.

In addition, at least some prior art devices have been difficult to adjust, requiring, for example, the use of hand tools by the operator from the top of the bin after shut down of the implement.

Also, the use of larger bins has made the problem of even distribution of grain more acute, and has increased the need for an effective, easy to use, and safe spreader which is compatible with larger bins.

With respect to prior art patents, U.S. Pat. Nos. 3,151,750; 3,446,372 and 4,040,529 relate to devices for distributing grain within a bin utilizing a rotary distributor; U.S. Pat. No. 3,780,887 relates to a rotating distributor having a variable speed drive; U.S. Pat. No. 3,490,619 relates to a grain distributor that is air-rotatable at varying speeds; U.S. Pat. No. 963,583 relates to a silo feeder with an elbow that is rotatively air driven; and U.S. Pat. Nos. 3,606,103; 3,716,167; 3,995,668; 4,074,836 and 4,138,020 relate to various types of dividers and/or distributors for grain and the like.

SUMMARY OF THE INVENTION

This invention provides an improved grain distribution device that is capable of uniform distribution of grain within a bin during loading without causing appreciable damage to the grain due to impact of the grain.

It is therefore an object of this invention to provide an improved grain distribution device that provides substantially uniform distribution of grain and substantially maintains grain level within a bin during fill.

It is yet another object of this invention to provide an improved grain distribution device that distributes grain without causing appreciable damage due to impact of the grain.

It is still another object of this invention to provide an improved grain distribution device that is effective, easy to use, and compatible for use with large bins.

It is yet another object of this invention to provide an improved grain distribution device having a hopper with funnels for controlling flow of grain in conjunction with the grain, variable distributing arms receiving the grain from the hopper, and a variable speed drive for rotating the arms.

With these and other objects in views, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
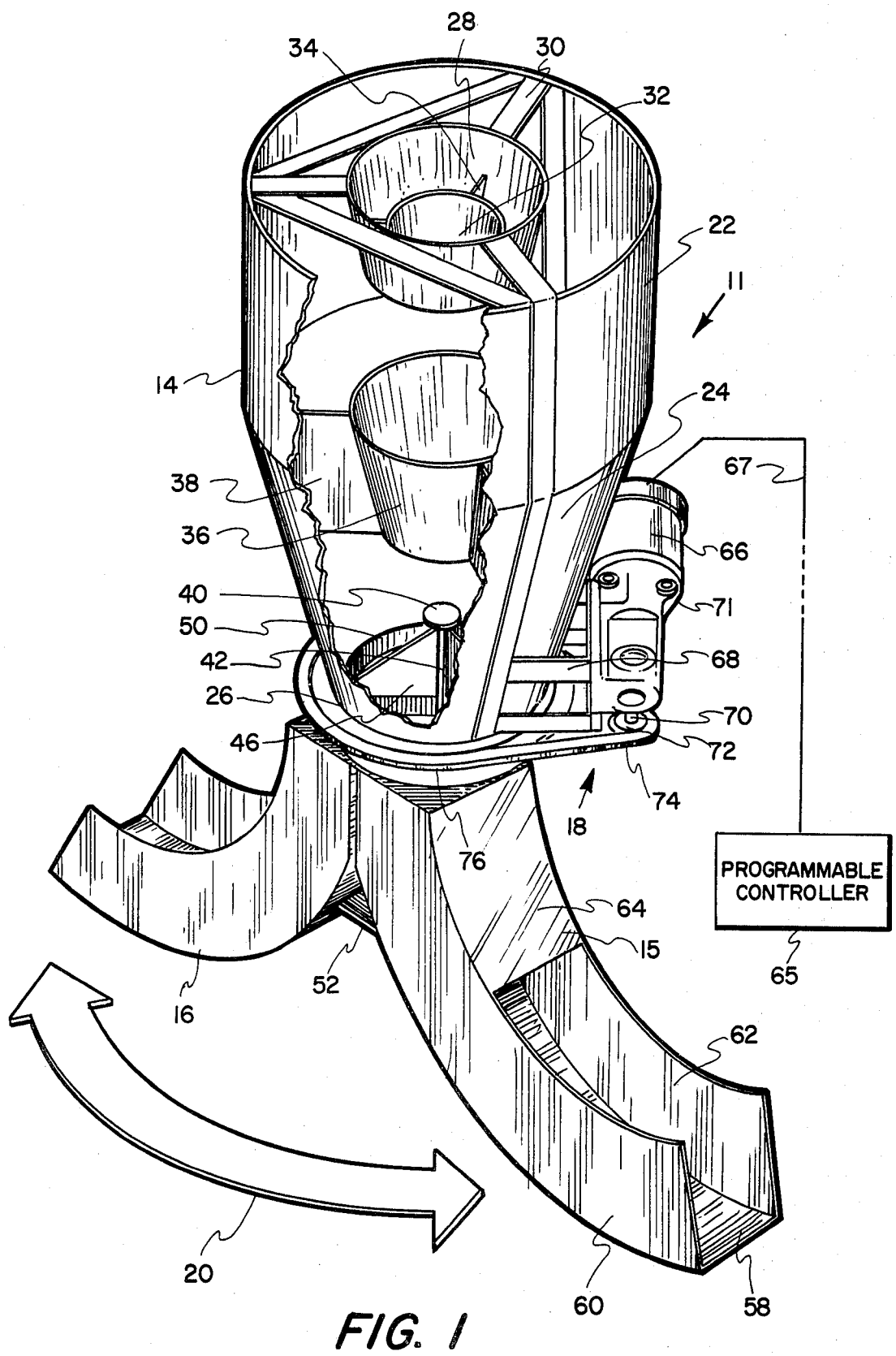
FIG. 1 is a partially cut-away perspective view of the grain distributing device of this invention.
Figure 3:
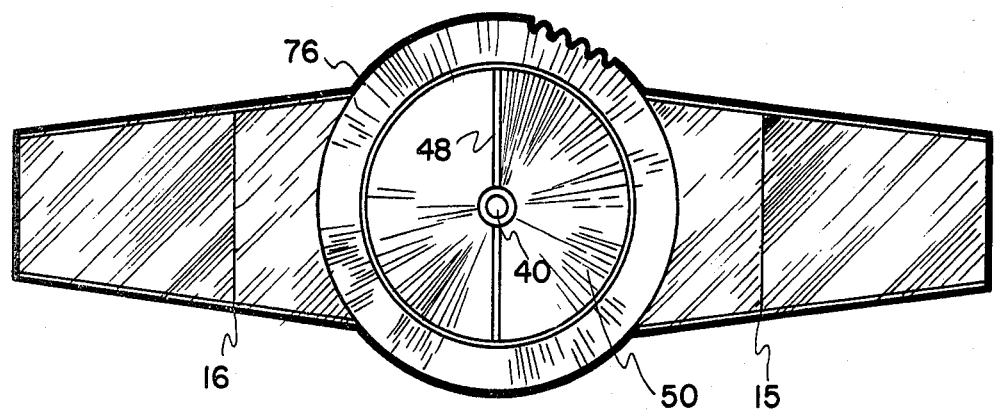
FIG. 3 is a top sectional view of the device shown in FIGS. 1 and 2 taken through the bottom edge of the hopper.

Referring now to the drawings, grain distribution device 11 of this invention is shown to include a hopper 14, distributing arms 15 and 16, and an arm drive 18.

Device 11 is particularly useful in conjunction with a bin (not shown) such as a grain drying and/or storage bin with the device being centrally positioned at the top of the bin to receive grain and uniformly distribute the grain throughout the bin. In addition, device 11 is particularly useful with a wide range of bins having diameters of, for example, 24 feet to 60 feet, and is compatible with various grain storing devices in use at the present time.

Hopper 14 collects and channels the flow of grain by means of a "straight-through" flow control system, while arms 15 and 16 direct and propel the grain in a uniform stream output without damaging the grains, with the rotation of arms 15 and 16 being controlled by drive 18 which allows variable speed operation of the arms from a remote location if desired. The arms 15 and 16 can be rotated in either direction as indicated by the arrow 20.

Hopper 14 includes a cylindrical top portion 22, a funnel shaped lower portion 24 the sides of which converge from the top portion 22 to terminate at bottom edge 26. Hopper 14 may be formed of any suitably rigid material, and preferably is formed of a metal.

Top portion 22 of hopper 14 has an outer funnel 28 centrally positioned therein, which funnel has side walls which converge downwardly from the top of the hopper with funnel 28 being mounted to top portion 22 of hopper 14 by means of mounting brackets 30.

Figure 2:
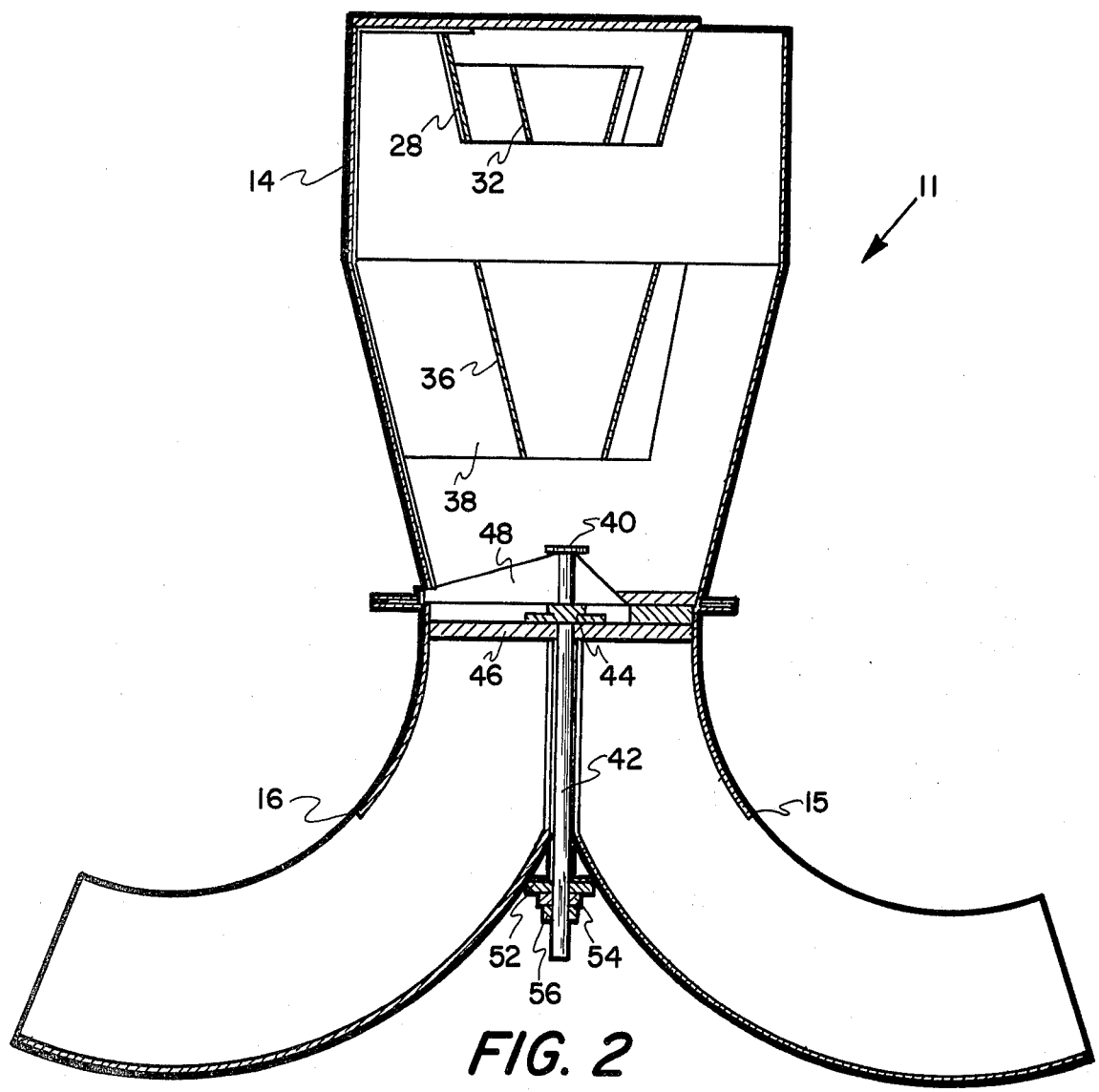
FIG. 2 is a side sectional view of the device as shown in FIG. 1.
Figure 5:
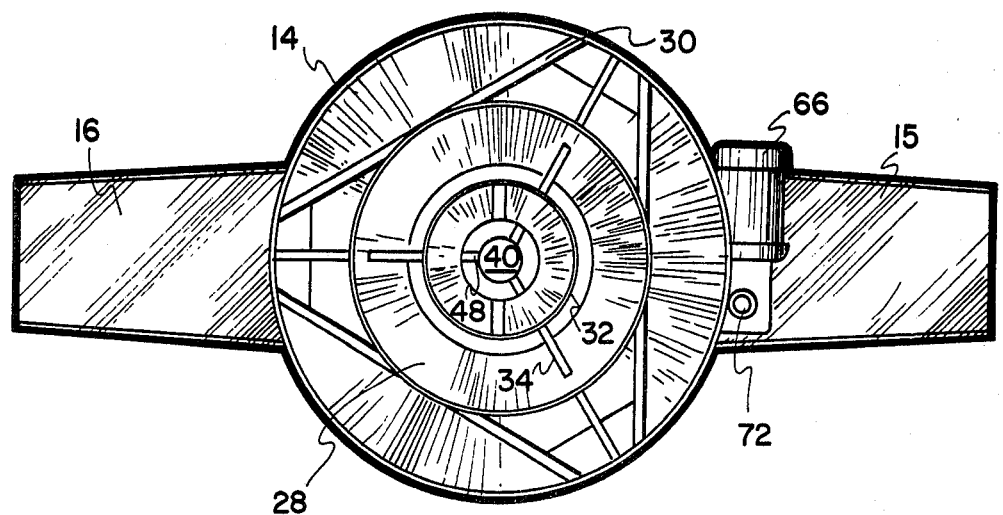
FIG. 5 is a top view of the device as shown in FIG. 1.
Figure 4:
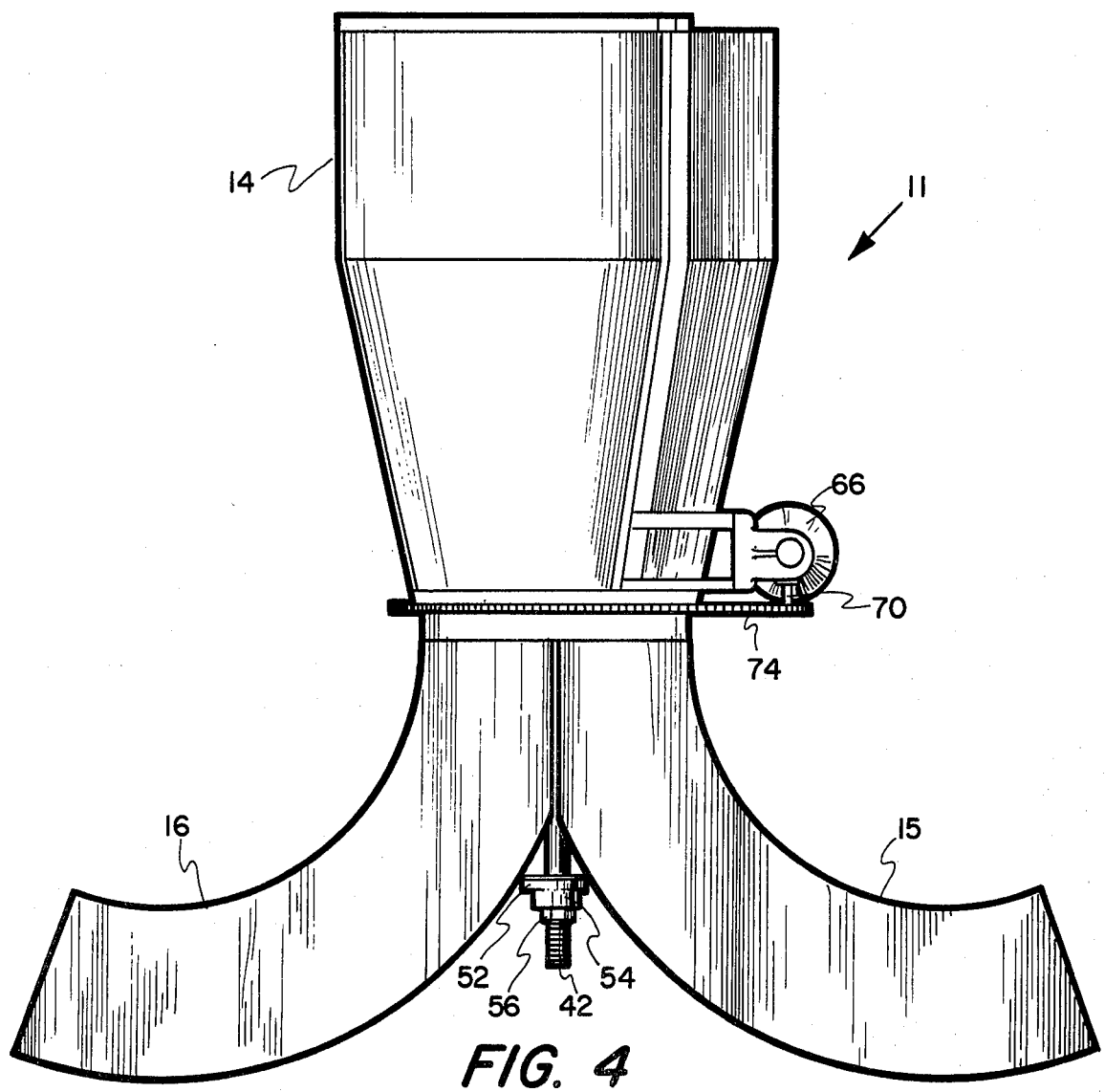
FIG. 4 is a side view of the device as shown in FIG. 1.
Figure 6:
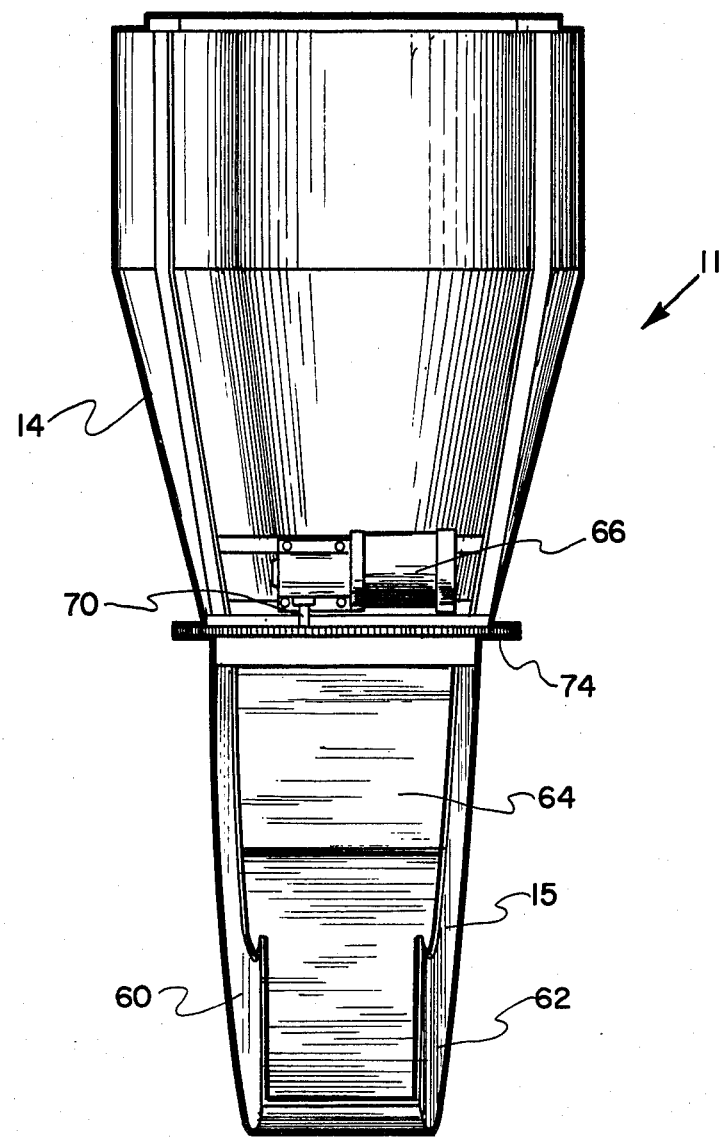
FIG. 6 is an end view of the device as shown in FIG. 1.

An inner funnel 32 is coaxially positioned within outer funnel 28 by means of vanes 34, which also control the flow of grain, with the top of inner funnel 32 being downwardly positioned with respect to the top of outer funnel 28 so that the sides of the inner and outer funnels are parallel with respect to one another and terminate at bottom edges that are in a common horizontal plane (as shown best by FIG. 2).

A central funnel 36 is positioned within the lower portion 24 of hopper 14 by means of vanes 38, which vanes control the flow of grain, with funnel 36 having a top edge in a common horizontal plane with the top edge of lower portion 24 of hopper 14, and having side walls that extend parallel to the side walls of lower portion 24.

Near the bottom of lower portion 24 of hopper 14, and below central funnel 36, a centrally positioned disc, or button, 40, is fixed to the top of shaft 42. Shaft 42 extends from the bottom of hopper 14 through nut, or spacer, 44, and through plate 46, which plate has mounted thereon vanes 48 extending from shaft 42 to outer ring 50 (at the periphery of the bottom edge of the hopper). The lower end of shaft 42 has spacers 52 and 54 thereon which are secured by threaded nut 56 (shaft 42 is threaded at least at these portions engaging the nuts) so that the outer assembly is mounted and positioned below hopper 14 by means of shaft 42 having spacers and nuts 44, 52, 54 and 56 thereon. Shaft 42 can have other equipment attached to the bottom thereof if necessary or desired.

Inner funnel 32 is used for directing grain therethrough at low volume or flow rates, outer funnel 28 is used for directing grain therethrough at high volume or flow rates, and central cone 36 is used for directing grain therethrough from about 1500 to 2000 bushels per hour, and then directing grain both therethrough and thereby when the flow rate is above about 2000 bushels per hour. The combination of the funnels, dividers and mounts divides the grain substantially equally between the arms 15 and 16. All of the funnels are made of a substantially rigid material, preferably a metal, as are the mounts.

The distributing, or slinging, arms are utilized to distribute the grain passing through the hopper. It has been found that a minimum of two arms are necessary, but more can be utilized if desired. The arms are preferably formed of a rigid material such as a metal.

The walls of arms 15 and 16 form a curved chute for establishing the path of the grain therethrough. The arms are curved so that the grain flowing through them is gently redirected to minimize grain damage and accelerated to propel the grain (including any "fines" included therein) away from the arms.

As shown, arms 15 and 16 each include a curved back wall 58 with parallel side walls 60 and 62 extending outwardly therefrom. The side walls 60 and 62 have a top wall 64 at the upper section of the chute to form a closed chute thereat, with top wall 64 terminating well short of the lower end so that the chute is essentially a U-shaped trough over about two-thirds of the chute to the discharge end thereof.

The arm assembly, which includes arms 15 and 16, rotates with respect to hopper 14, under the control of drive 18, which drive preferably includes a programmable controller 65, which controller is preferably remotely situated with respect to electric motor 66 and connected thereto through electrical cable 67. As shown best in FIG. 1, motor 66 (which may be a conventional DC electric motor) is mounted to hopper 14 by means of motor mount 68. Motor 66 rotates drive shaft 70 through conventional gear reducer 71 with shaft 70 having drive gear 72 mounted thereon for driving endless chain 74 which is also mounted on the periphery of arm assembly drive sprocket 76. Drive sprocket 76 is fixed to arms 15 and 16 to rotate the same with hopper 14 remaining fixed. Programmable controller 65 may be a simple switch for energizing and de-energizing motor 66, but preferably is a voltage proportioning device such as an electronic rheostat device the positioning of which is automatically varied by a preselected program. If desired, bearings (not shown) can be provided between the bottom 26 of the hopper and drive sprocket 76 to ensure a low friction abutment between the relatively moving surfaces, so long as the surfaces remain sufficiently adjacent so as to maintain an effective seal to grain between the hopper and arm assembly.

Hopper 14 is capable of handling a wide range of flow rates of between about 1500 bushels per hour to 5000 bushels per hour by varying the funnel capacities and spacing within the hopper. By moving the grain along the walls of the hopper and funnels, the distance and the paths of flow can be controlled without stopping the flow of grain.

Figure 7:
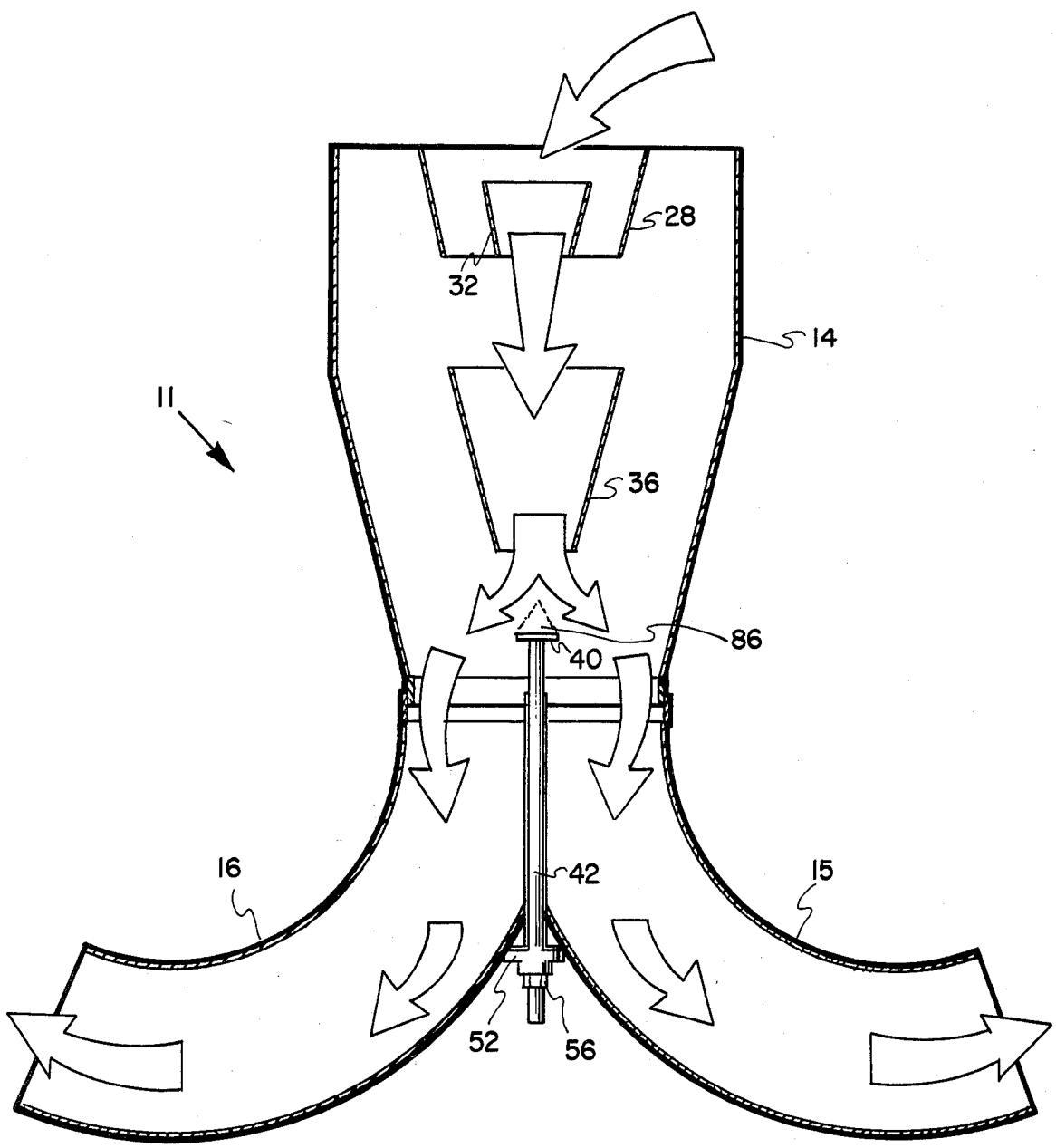
FIG. 7 is a side sectional view of the device as shown in FIGS. 1 and 2 illustrating the grain path during slow flow rates of the grain through the device.

With the device mounted at the top of a bin, and a minimum flow rate (approaching 1500 bushels per hour, for example), the material falls under the influence of gravity downwardly, as shown in FIG. 7, through inner funnel 28 where it is collected and directed through the funnel to central funnel 36 where the material is again collected and directed toward the vicinity of disc 40. Thus, at the lower flow rates, the inner and central funnels control the path of material flowing through the device so that the material forms a substantially centrally located inner flow path through the hopper.

When material is passing through the hopper, disc 40 has an inverted cone of grain (material) 86 formed thereon to contact the additional grain and separating the same so that the grain is directed to the rotating arms 15 and 16 where it is redirected and expelled from the device into the bin.

Figure 8:
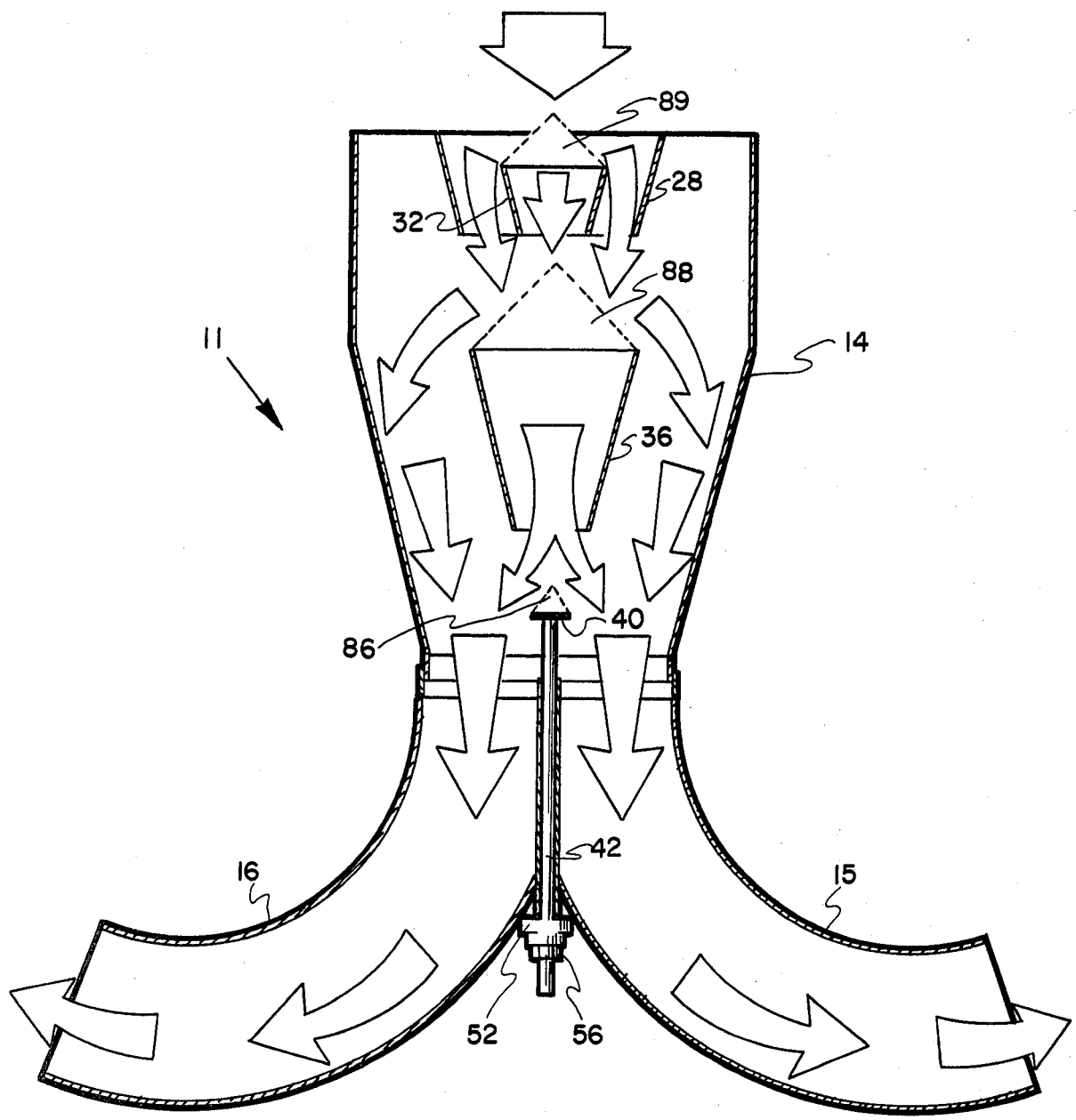
FIG. 8 is a side sectional view of the device as shown in FIGS. 1 and 2 illustrating the grain paths during fast flow rates of the grain through the device.
Figure 9:
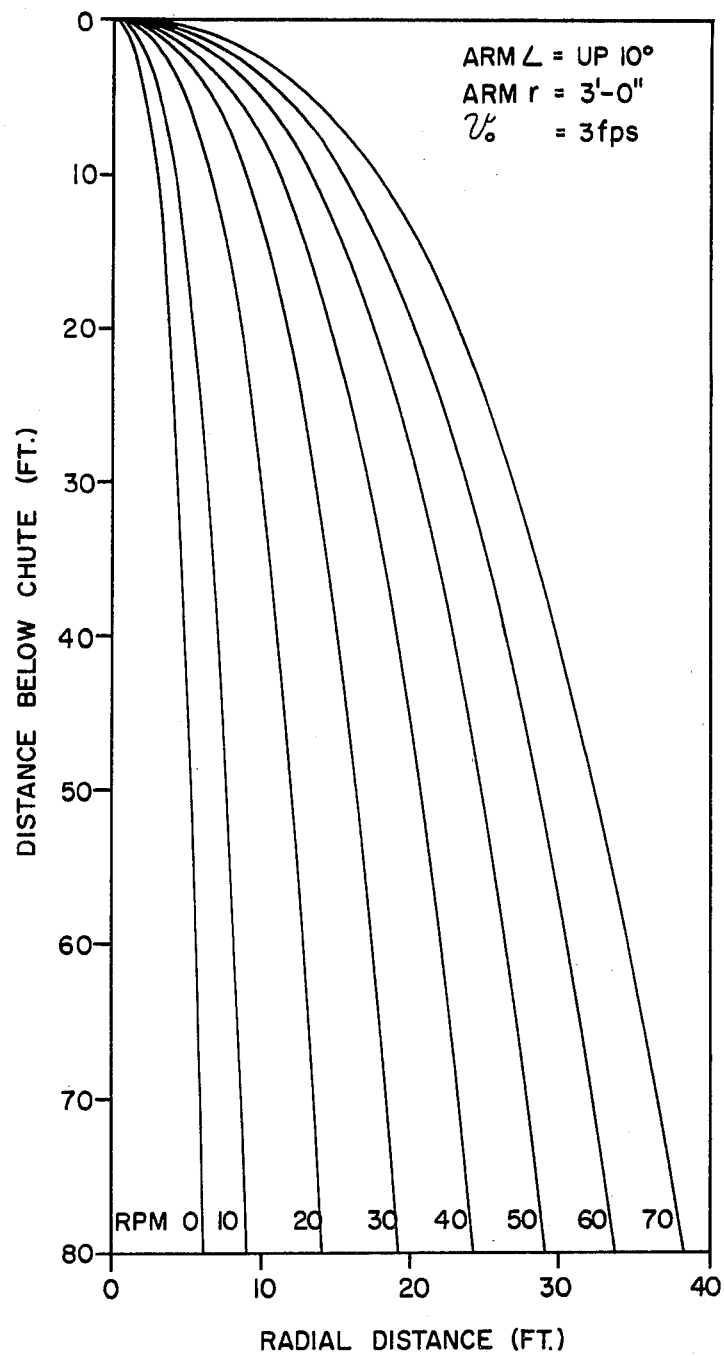
FIGS. 9 through 18 are graphs illustrating bin loading utilizing the device of this invention with different parameters.
Figure 10:
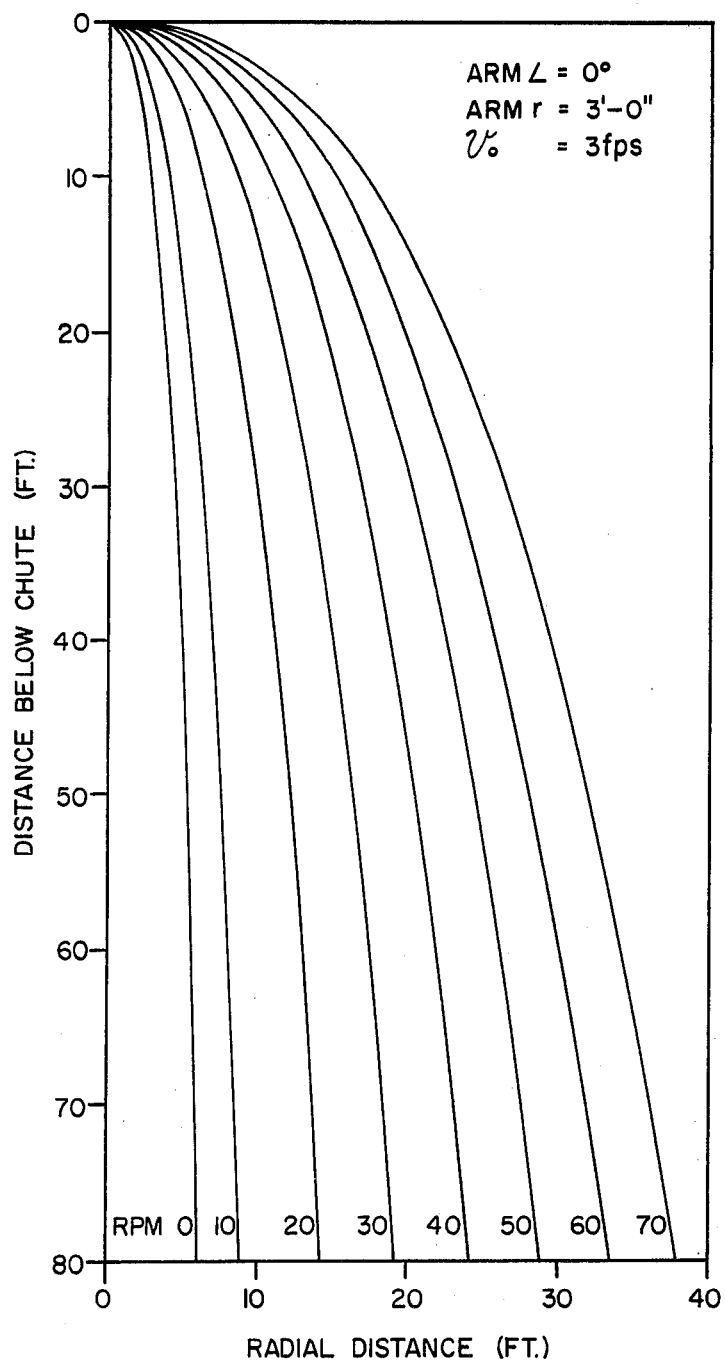
Figure 11:
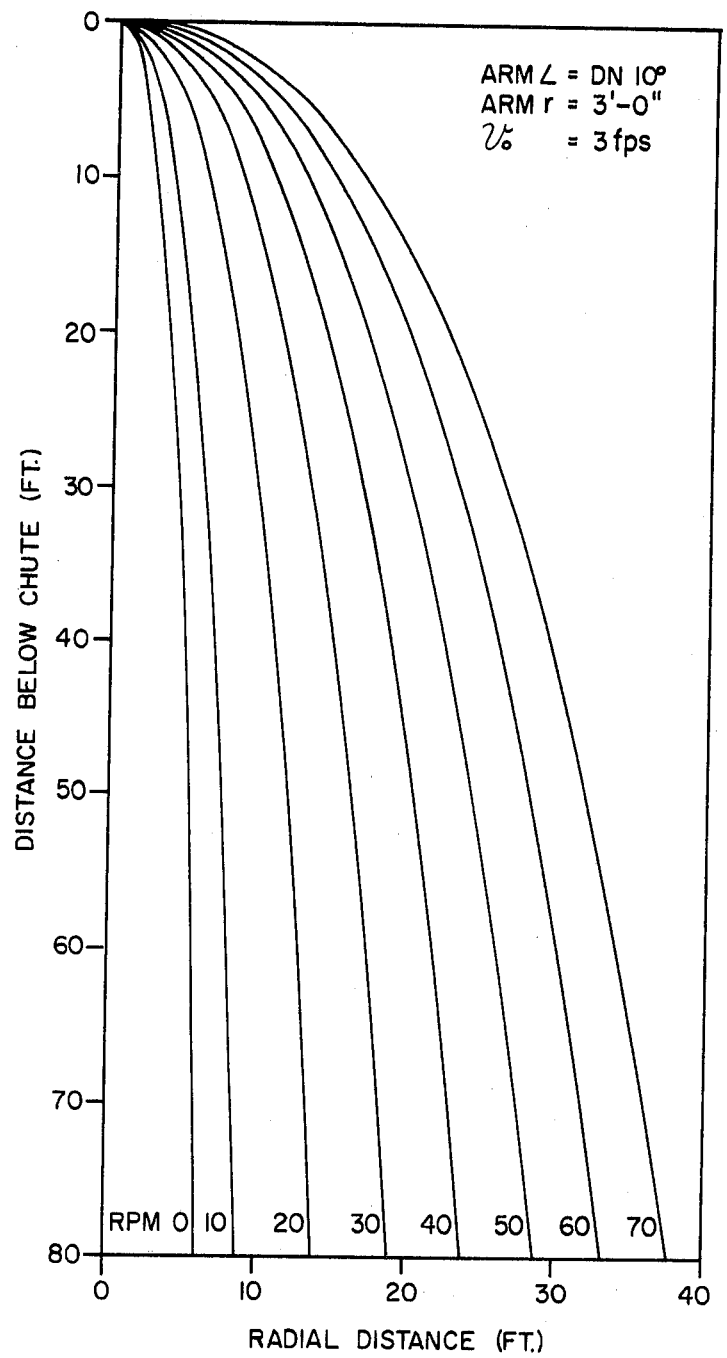
Figure 12:
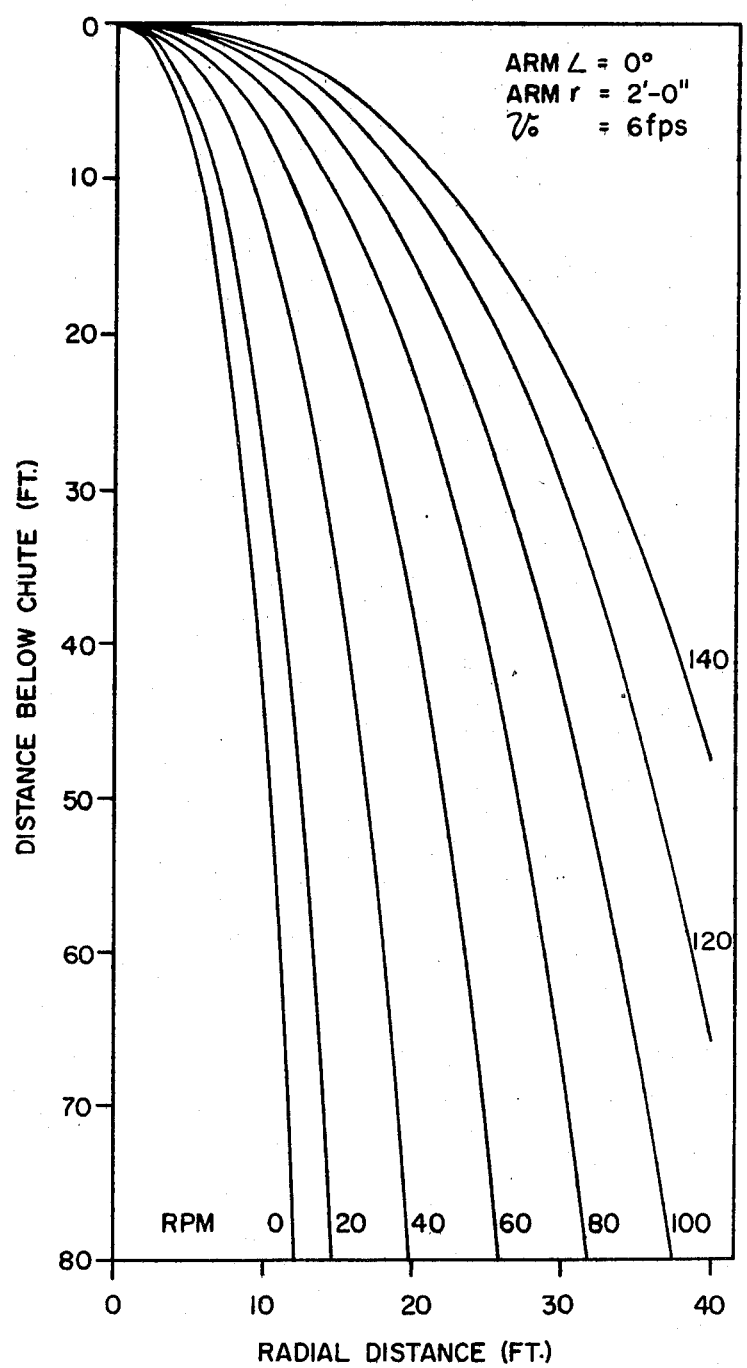
Figure 13:
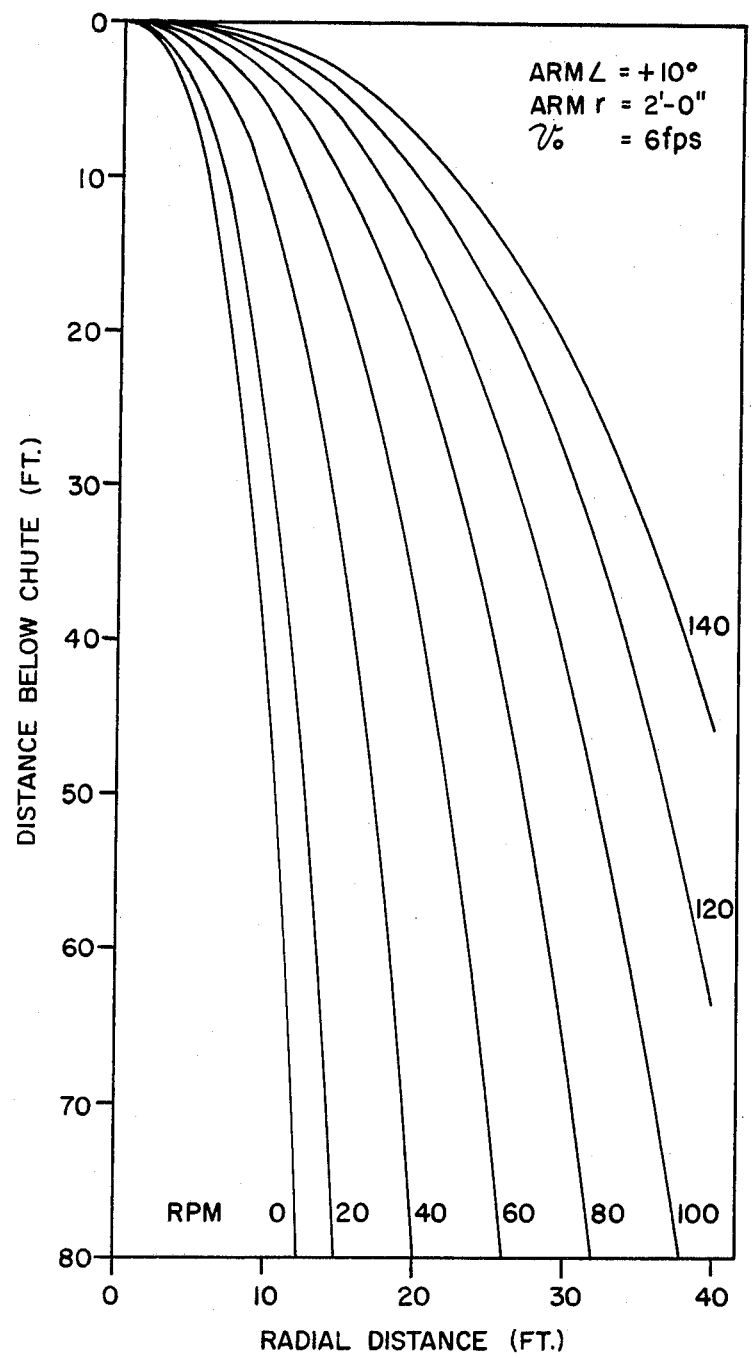
Figure 14:
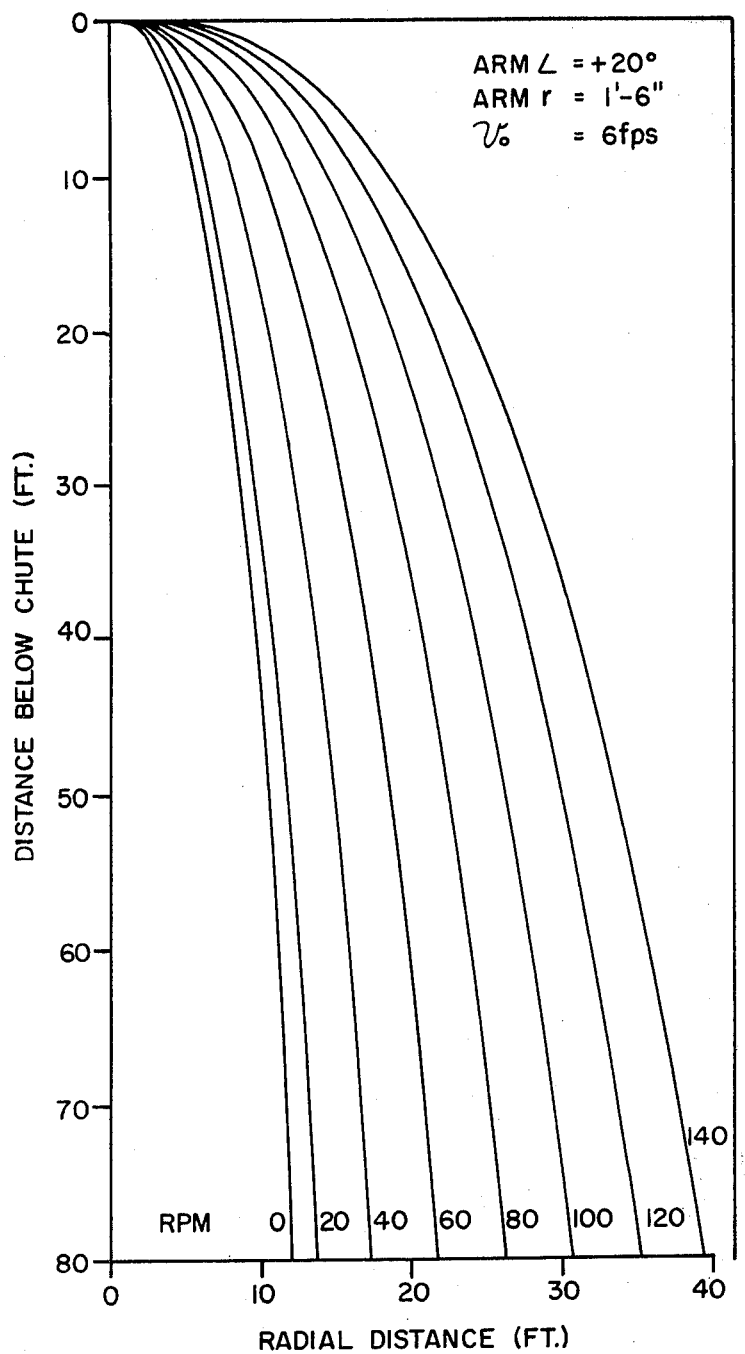
Figure 15:
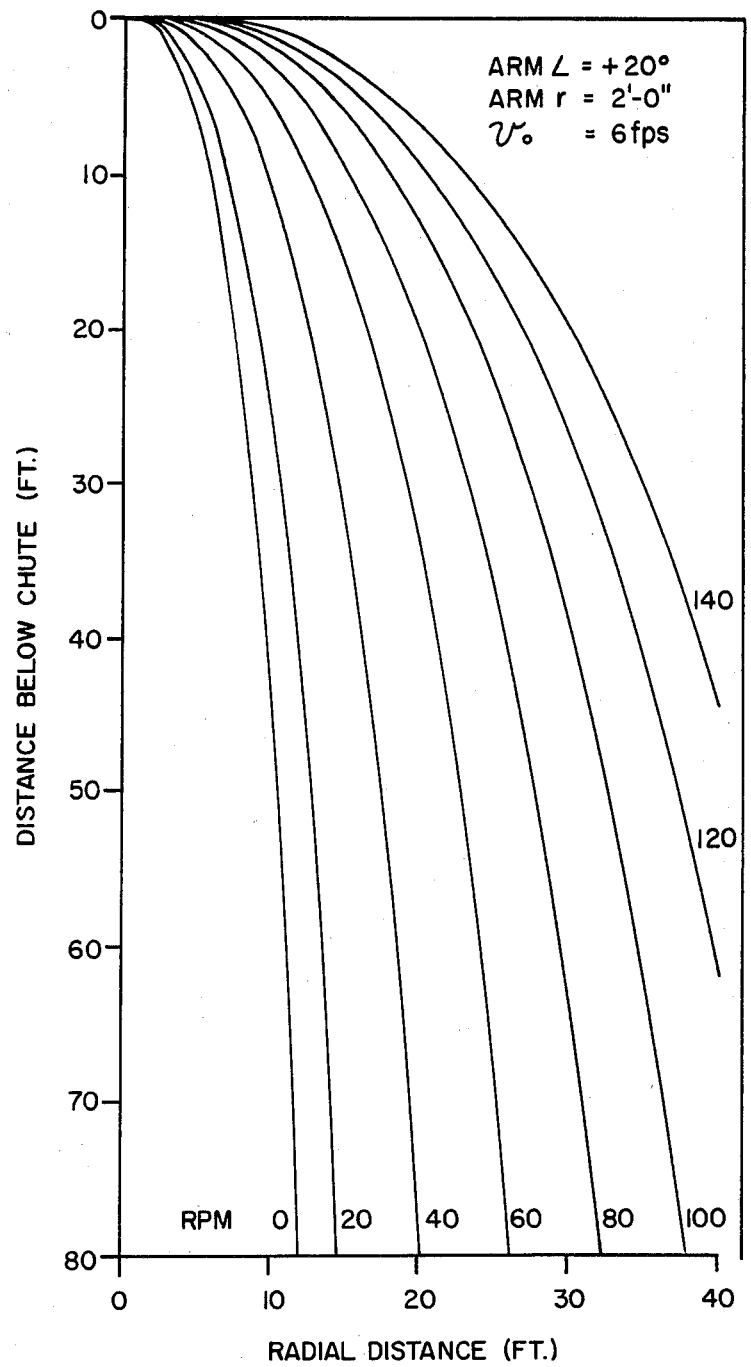
Figure 16:
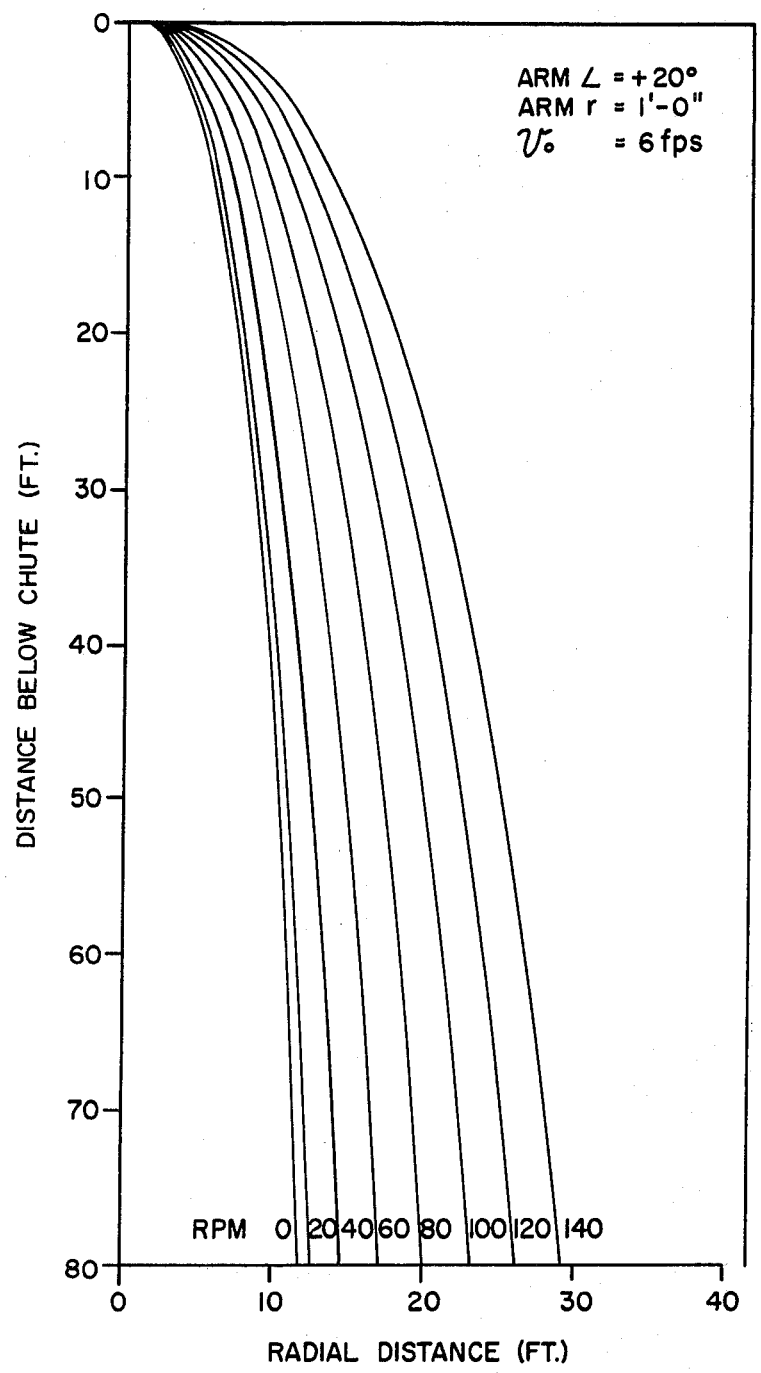
Figure 17:
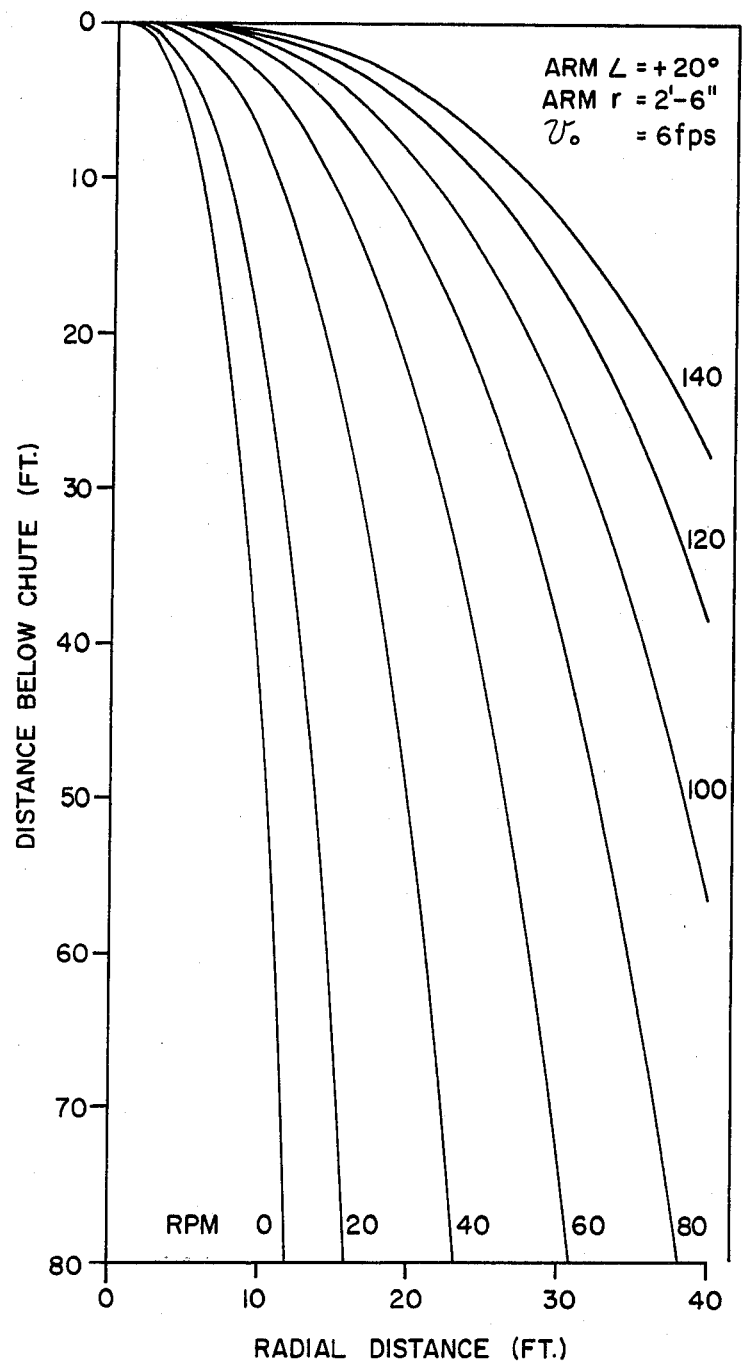
Figure 18:
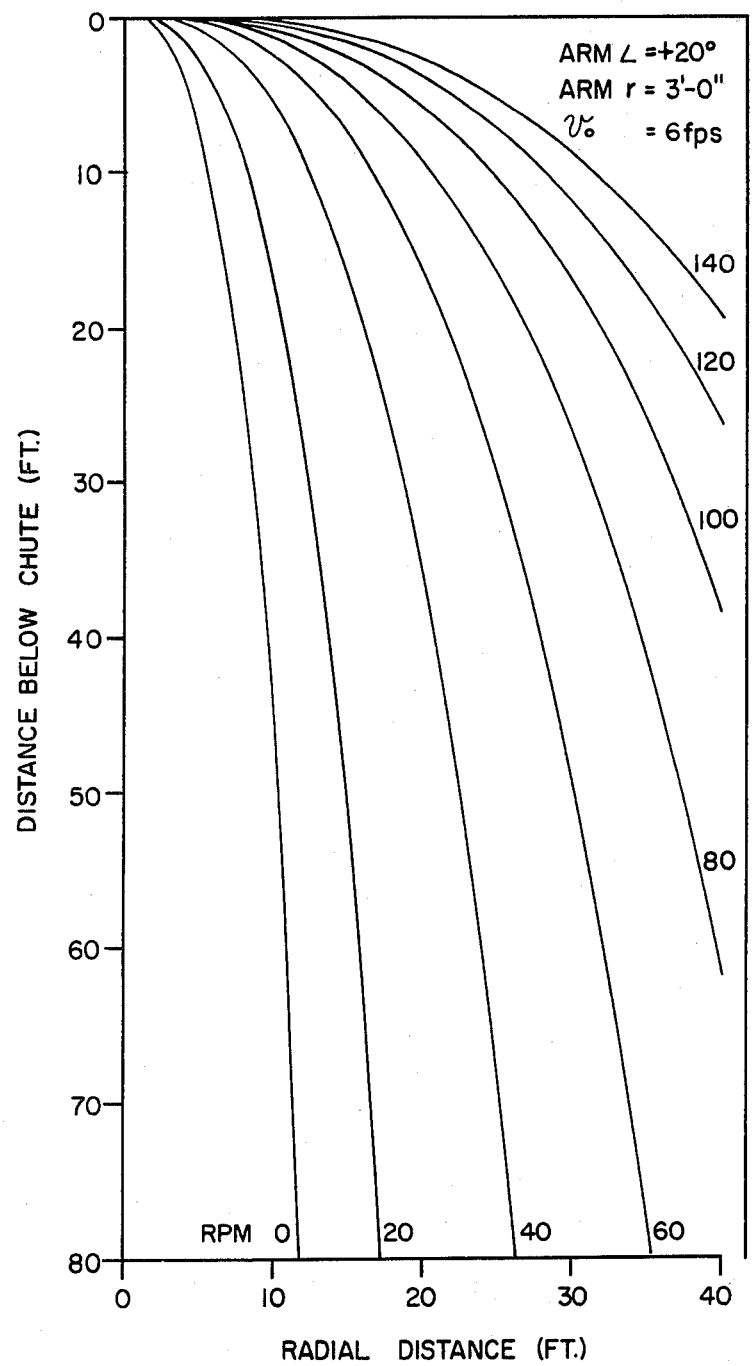

When the flow of grain is increased to a point where the material flow exceeds the capacity of inner funnel 32, as shown in FIG. 8, the material forms an inverted cone 87 at the top of the funnel so that material not handled through inner funnel 32 is directed through outer funnel 28 which collects the material and directs the material downwardly to form an outer path for the material in addition to the inner path.

When the flow of material to central funnel 36 surpasses its capacity, the material forms an inverted cone 88 at the top of the funnel which directs material not passing through the central funnel outwardly thereto to the outer walls of the lower portion 24 of hopper 14 to further establish outer paths of material which are directed downwardly toward arms 15 and 16 along with the flow through the inner path.

The arms are designed to divide the flow of grain from the hopper and redirect the grain evenly to fill a wide range of storage bins with a uniform distribution including a uniform distribution of "fines." This is achieved through use of arms that are curved for gentle redirection of grain to minimize grain damage and to accelerate grain flow to carry the grain to the far edges of the bin when necessary.

The curvature of the arms is directly proportional to the radial distance the arms extend from the center. Each arm, however, has an effective limit in length of between about one to three feet due to torque requirements and the throw distances needed.

An additional throw control is provided by the angle at which the grain is released in relation to a horizontal plane. This angle has been found to be variable between about −10° (i.e., 10° downward from horizontal) and +20° (i.e., 20° upward from horizontal). The length of the arms in conjunction with the angle of radius are of prime importance in achieving uniform distribution using relatively low arm rotational speeds, which low arm rotational speeds are made possible by this invention.

Variable speed control of the arms is provided by programmable controller 65 in conjunction with motor 66. Control of the speed of rotation of the arms in conjunction with their shape and positioning allows accurate placement of material within a bin to be loaded. With this invention, filling of the bin occurs at much lower rotational speeds than heretofore, and the reduced speed of rotation of the arms allows more time to control and direct the flow of grain.

Placement of the grain within the bin may be by manual control or by the use of a preset program that regulates arm rotation to ensure a uniform fill, thus sparing the operator from having to make numerous checks and adjustments throughout the fill cycle. Should adjustments be required, however, they can be made safely by the operator from the ground.

By computer analysis of practical testing, it has been determined that the speed at which the grain is propelled from the arms is more significant in effecting the flow pattern and distance than is the angle of the throwing apparatus. Therefore, it is felt to be preferable to use arms which are not adjustable (once chosen) in angle, as shown in the embodiment of FIGS. 1 through 8, so that the speed of rotation of the arms primarily controls the grain spread.

A variable speed motor 66 is then utilized, which motor is preferably controlled from remotely positioned speed controller 65, to allow the operator to control the drive from the ground. By varying the speed of the motor, the operator can direct the grain into that portion of the bin as is needed to gain a uniform loading of the bin from the far reaches to the central portion of the bin (even though the bin is very large as, for example, a bin of 60 feet diameter). Thus, the operator can manually fill the bin as desired, or utilize a preset program to assure uniform distribution of grain within the bin.

By utilizing a "straight-through" flow control system, the grain flow is regulated by this invention by means of the interior funnels and cones and is capable of handling a variety of flow rates. In addition, the "straight-through" flow control system of this invention maintains the flow to the arms evenly so that an even bin flow is achieved. By regulating the speed of rotation by a programmable drive with a programmed pattern, the drive enables the uniform fill of different size bins even if a variety of grain conditions are encountered.

The curved arms translate the vertical velocity of the grain into horizontal velocity to aid in throwing the grain which has been formed by the arms into a "tube-like" shaped stream (rather than scattering the grain) and this confines many of the fine particles within the stream to thus carry the fines away from the center of the bin which aids in uniform distribution of grain throughout the bin. The length of the arms enable the grain to be thrown out from the device using lower speeds of rotation, particularly where longer arms are utilized, to minimize grain damage and aid in uniform distribution.

The graphs of FIGS. 9 through 18 show the various parameters discussed hereinabove and their effect upon bin filling.

As can be appreciated from the foregoing, this invention provides a material distribution device that is capable of handling a wide variety of flow rates and is well suited for uniformly loading grain into bins having a wide variety of sizes, all without causing appreciable damage to the grain.

What is claimed is:

1. A grain distribution device, comprising:
    a cylindrical hopper having an upper section for receiving grain to be distributed, a lower section with cylindrical downwardly converging side walls, and a bottom edge for discharging grain from said hopper after said grain has passed therethrough;
    inner and outer coaxially positioned funnels within said upper section of said hopper, said inner funnel contacting grain at low flow rates through said hopper to collect the same and direct said grain downwardly in an inner path, and said inner and outer funnels collecting grain at high flow rates through said hopper to collect the same with said inner funnel forming an inverted cone of grain over said funnel to direct grain to said outer funnel at high flow rates whereby said inner and outer funnels direct grain downwardly in inner and outer paths at high flow rates;
    a central funnel within said lower section of said hopper, said central funnel receiving and collecting grain at low flow rates from said inner funnel and directing the same downwardly in an inner path, and said central funnel forming an inverted cone of grain at high flow rates to establish inner and outer downwardly directed paths of grain;
    a separating cone below said central funnel for contacting grain in said inner path from said central funnel to separate the same into separate paths, said separating cone being formed of grain;
    a pair of curved arms rotatively mounted with respect to said hopper, each of said arms having an input end adjacent to said bottom edge of said hopper for receiving grain therethrough and a discharge end that is substantially normal to the direction of flow of grain through said hopper, with each of said arms extending about one to three feet outwardly from an extended line through the center of said hopper; and a variable speed drive means for rotating said arms at a rate sufficient to uniformly distribute grain discharged from said arms.

2. The device of claim 1 wherein the side walls of said central funnel are substantially parallel to the said walls of said lower section of said hopper.

3. The device of claim 1 wherein the angle and length of said arms are chosen so that a low rate of speed of rotation of said arms is utilized to effect uniformity of distribution of grain both at high and low flow rates through said device.

* * * * *